United States Patent
Kaufmann et al.

(10) Patent No.: US 10,752,085 B2
(45) Date of Patent: Aug. 25, 2020

(54) TEMPERATURE SENSOR FOR A VEHICLE

(71) Applicant: Volkswagen Aktiengesellschaft, Wolfsburg (DE)

(72) Inventors: Thorsten Kaufmann, Salzgitter Bad (DE); Sabrina Hübscher, Weyhausen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 240 days.

(21) Appl. No.: 15/928,440

(22) Filed: Mar. 22, 2018

(65) Prior Publication Data

US 2018/0272838 A1    Sep. 27, 2018

(30) Foreign Application Priority Data

Mar. 22, 2017  (DE) .................. 10 2017 204 841

(51) Int. Cl.
  *B60H 1/00*     (2006.01)
  *G01K 1/00*     (2006.01)
  (Continued)

(52) U.S. Cl.
  CPC ..... *B60H 1/00807* (2013.01); *B60H 1/00792* (2013.01); *B60R 16/023* (2013.01);
  (Continued)

(58) Field of Classification Search
  CPC .. B60H 1/00807; B60H 1/00792; G01K 1/00; G01K 13/00; G01K 1/024; G01K 2201/02; G01K 1/20; G01K 15/005; B60R 16/023
  (Continued)

(56) References Cited

U.S. PATENT DOCUMENTS

| | | | |
|---|---|---|---|
| 6,283,628 B1 | 9/2001 | Goodwin | .......................... 374/1 |
| 8,790,005 B2 | 7/2014 | Tylinski et al. | ............... 374/100 |

(Continued)

FOREIGN PATENT DOCUMENTS

| | | | |
|---|---|---|---|
| CN | 105774704 A | 7/1916 | .......... B60R 16/037 |
| CN | 103109168 A | 5/2013 | ............... G01K 1/20 |

(Continued)

OTHER PUBLICATIONS

Wikipedia, Local Interconnect Network, Mar. 11, 2016, Wikipedia—The Free Encyclopedia (<https://en.wikipedia.org/w/index.php?title=Local_Interconnect_Network&oldid=709493883 >) (Year: 2016).*

(Continued)

*Primary Examiner* — Nadeem Odeh
(74) *Attorney, Agent, or Firm* — Slayden Grubert Beard PLLC (57) ABSTRACT

A temperature sensor for a vehicle that is designed to detect an interior temperature of the vehicle and that can be arranged in the vehicle. The temperature sensor provides improved usability and can be manufactured more easily. In particular, the temperature sensor allows raw data of the temperature sensor to be evaluated by the temperature sensor itself. An advantage of this setup thus is that a tedious sensor-specific adaptation of an associated control device in the vehicle for evaluating the raw data is not necessary. Different temperature sensors can be used with the control device without the control device having to be adapted in a different way to each of these temperature sensors.

17 Claims, 3 Drawing Sheets

(51) Int. Cl.
  *B60R 16/023* (2006.01)
  *G01K 13/00* (2006.01)
  *G01K 1/02* (2006.01)

(52) U.S. Cl.
  CPC ............... *G01K 1/00* (2013.01); *G01K 13/00* (2013.01); *G01K 1/024* (2013.01); *G01K 2201/02* (2013.01)

(58) Field of Classification Search
  USPC .......................................................... 701/36
  See application file for complete search history.

(56) References Cited

U.S. PATENT DOCUMENTS

| | | | |
|---|---|---|---|
| 9,022,646 B2 | 5/2015 | Hentschel et al. ............ 374/142 | |
| 9,469,176 B2 | 10/2016 | Boyer et al. | |
| 2005/0199735 A1 | 9/2005 | Eisenhour et al. ............ 236/1 C | |
| 2009/0248244 A1* | 10/2009 | Sumimoto ......... B60H 1/00735 | |
| | | | 701/36 |
| 2016/0313227 A1 | 10/2016 | Schneider et al. ............ 73/30.01 | |
| 2017/0205293 A1 | 7/2017 | Lysen et al. | |

FOREIGN PATENT DOCUMENTS

| | | | | |
|---|---|---|---|---|
| DE | 102014217706 A1 | 3/1916 | ............... | G01C 9/02 |
| DE | 19704254 A1 | 8/1998 | ............... | B60H 1/00 |
| DE | 10133388 A1 | 1/2003 | ............... | G01K 7/42 |
| DE | 10251128 B3 | 2/2004 | ............... | B60H 1/00 |
| DE | 202009001069 U1 | 4/2009 | ............... | B60H 1/00 |
| DE | 102013226140 A1 | 6/2015 | ............. | F02D 41/00 |

OTHER PUBLICATIONS

Hartmann, Stephen, "Automotive LIN Bus Driving Sensor Applications," Automotive Compilation, vol. 7, www.atemel.com, 3 pages, 2010.
Kuhn, Jiri, "Application Note: AN2623/D: LIN Temperature Sensor Using the MC68HC908QT/QY MCU," Freescale Semiconductor, Inc., www.freescale.com, 20 pages, Dec. 2003.
"IDT: ZSSC3170 Datasheet: Automotive Sensor Signal Conditioner with LIN and PWM Interface," Integrated Device Technology, Inc., 30 pages, May 30, 2016.
German Office Action, Application No. 102017204841.7, 7 pages, Jan. 9, 2018.
Extended European Search Report, Application No. 18159137.1, 9 pages.
ZSSC 3170 Datasheet, "Automotive Sensor Signal Conditioner with LIN and PWM Interface," Integrated Device Technology, Inc., 30 pages.
"ZSSC3170: Automotive Sensor Signal Conditioner with LIN and PWM Interface," Renesas Electronics Corporation, URL: https://www.idt.com/us/en/document/dst/zssc3170-datasheet, 31 pages, May 30, 2016.

* cited by examiner

TEMPERATURE SENSOR FOR A VEHICLE

CROSS-REFERENCE TO RELATED APPLICATIONS

This application claims priority to DE Application No. 10 2017 204 841.7 filed Mar. 22, 2017 with the German Patent and Trademark Office, the contents of which application are hereby incorporated by reference in their entireties.

TECHNICAL FIELD

The present invention relates to a temperature sensor for a vehicle. Moreover, the invention relates to a system, a method, and a computer program product.

BACKGROUND

Temperature sensors for vehicles that serve to determine the interior temperature within a vehicle are known from the prior art. Such temperature sensors can be designed as unventilated interior temperature sensors (also UIP, unventilated interior temperature probe), i.e., in this case, the temperature sensor does not have to be forced-ventilated.

An unventilated interior temperature probe is known, for example, from DE 20 2009 001 069 U1. The temperature probe is connected to two electrical temperature sensor-specific connecting elements that are lead out of the sensor housing.

Frequently, conventional UIPs that, for example, are arranged in a climate operating unit have such a sensor-specific interface by means of which the raw data of the UIP are provided. A control device of the climate operating unit then reads out these raw data via the interface and determines the interior temperature using the raw data. For this, the software of the control device must be specially adapted to the temperature sensor. It may be necessary for the control device, on the one hand, to recognize the required information in order to be able to process the raw data and to be parameterized on the other hand so that vehicle information and the specific installation site of the sensor are taken into account when determining the temperature. This is generally accomplished in that a special software is produced and/or adapted to the control device depending on the vehicle, the installation site and the sensor. Accordingly, a tedious adaptation and production of the control device and possibly also the entire climate operating unit is needed in order to use a specific temperature sensor.

The disadvantage of the known solutions is therefore that a significant amount of adaptation and/or production effort is often generated in order to use a temperature sensor in a vehicle. Frequently it is necessary for the temperature sensor to be integrated into another component of the vehicle such as a climate operating unit.

To ensure that the temperature is correctly determined using the raw data of the sensor, a control device of the vehicle must be adapted to the sensor in a tedious manner. This adaptation can be technically involved and challenging.

SUMMARY

An object of the present invention is therefore to at least partially overcome the disadvantages described in the preceding.

In particular, it is an object of the present invention to provide an improved and/or more easily useable and/or easier-to-produce temperature sensor, or respectively a corresponding system and method as well as temperature detection computer program.

The preceding object is solved, e.g., by a temperature sensor having the features of claim 1, by a system having the features of the corresponding independent claim, by a method having the features of the corresponding independent claim, and by a computer program product having the features of the corresponding independent claim. Additional details and embodiments of the invention are apparent from the respective dependent claims, the description, and the drawings.

Certainly, the details and embodiments that are described in conjunction with the temperature sensor also are applicable to the system, the method, and the computer program product according to the invention and vice versa so that mutual reference is always made, or respectively can be made with regard to the disclosure of the individual aspects and embodiments of the invention.

BRIEF DESCRIPTION OF THE DRAWINGS

The invention is explained in the following using exemplary embodiments.

DETAILED DESCRIPTION OF EMBODIMENTS

In one aspect, a temperature sensor for a vehicle is provided that is designed to detect an interior temperature of the vehicle and (for this purpose) is arrangeable, i.e., may be arranged, and/or may be installed in the vehicle.

For example, the vehicle may be designed as a motor vehicle and/or passenger motor vehicle and/or electric vehicle.

In this aspect, the temperature sensor may comprise at least one of the following units:
  at least one (in particular electronic) processing unit for determining at least one (in particular digital) temperature value by evaluating (digital or analog) raw detected data from the temperature sensor,
  at least one modular interface unit for data exchange with a control device of the vehicle so that the at least one temperature value can be provided via the interface unit to the control device.

In other words, with a temperature sensor according to the present aspect, the raw data of the temperature sensor (raw detected data) is not initially evaluated in the control device of the vehicle (provided external to the temperature sensor), but by the temperature sensor itself. The advantage of this setup thus is that a tedious sensor-specific adaptation of the control device for evaluating the raw data is not necessary. This way, different temperature sensors can be used with the control device without the control device having to be adapted in a different way to each of these temperature sensors. To further improve this flexibility, a modular interface unit may in one embodiment be provided as an interface to the control device.

In this context, the term "modular" is understood to mean that a defined interface is provided (in particular by the interface unit). This interface enables data to be exchanged according to a given definition (such as an interface protocol). In one embodiment, it is provided that the control device only has to be designed to exchange data according to this interface protocol, so that temperature values from different types of temperature sensors can also be read out via the interface. This allows an adaptation of the control device to different interfaces of different types of temperature sensors to be omitted. In another embodiment, the temperature sensor implements the modular interface using the interface unit. In a further embodiment, the control device interface implements the modular interface using a control device interface that can be connected to the interface unit for data exchange (electrically as the case may be). It is moreover conceivable in one further embodiment, that this interface does not have a sensor-specific (i.e., for example a manufacturer-specific and/or vehicle-specific) adaptation, i.e., is designed independent of a certain temperature sensor type and/or vehicle type.

In another embodiment, the temperature sensor is designed as a UIP (an unventilated interior temperature probe). According to a further embodiment, the temperature sensor is integrated in a climate operating unit. In an alternative embodiment, the temperature sensor is arrangeable and/or is attached as an external temperature sensor outside of a climate operating unit in the vehicle.

In the present context, "raw detected data" is understood to be the "raw" data of the temperature sensor that are determined directly during the detection of the temperature. These can be, for example, electrical signals that, for example, are ascertained using the electrical properties and/or by an electrical evaluation of a temperature-dependent resistance of the temperature sensor. However, in this context there is in particular no electronic evaluation to the effect that the temperature could already be determined directly using the raw data.

In other words, the raw data cannot yet serve to directly determine the detected temperature without an evaluation being performed using temperature sensor-specific and/or vehicle-specific information. For example, the temperature value contrastingly describes information and/or data and/or electrical signals that can already be interpreted as the detected interior temperature without knowing the specifically used temperature sensor and/or the vehicle and/or the installation region (installation position) of the temperature sensor.

In one embodiment, the processing unit comprises at least one integrated circuit and/or processor and/or electronic system to run a computer program for evaluating. According to another embodiment, this computer program is saved in particular as a non-volatile computer program product in a data memory unit of the processing unit and/or of the temperature sensor. The computer program may, e.g., be used for different vehicles and/or installation positions of the temperature sensor and/or for different temperature sensors.

In another embodiment, it can be provided that the interface unit is designed as a bus system interface, such as a LIN (local interconnect network) bus interface or as a CAN (controller area network) bus interface. In another alternative or additional embodiment, the interface unit is designed to be connected via a vehicle bus system, for example a LIN bus system or CAN bus system or the like, to the control device, e.g., to a control device interface. One advantage is that a modular interface can be easily used with minimal design effort.

Within the context of the present aspect, the temperature sensor in one embodiment may comprise a data memory unit, for example a flash memory or the like, for the non-volatile storage of at least two different items of installation region information, wherein the items of installation region information are each specific to different installation regions of the temperature sensor in the vehicle. In other words, different items of installation region information are provided for different installation regions of the temperature sensor in the vehicle so that the temperature sensor can perform different evaluations of the raw detected data for different installation regions. One advantage of this embodiment being that without additional adaptation, the control device may be used with temperature sensors that are provided in different installation regions of the vehicle. An adaptation of the control device, or respectively of the control device software, can therefore be omitted even if the installation site of the temperature sensor is changed.

In one embodiment, for this purpose, a limited number of given installation regions in the vehicle may be predetermined so that the temperature sensor is already designed or respectively parameterized for different installation regions before being used in the vehicle. This can, for example, be accomplished with test drives in which the necessary parameters are compiled for different installation regions.

In another embodiment, the temperature sensor comprises a data memory unit for the (non-volatile) saving of at least two different items of installation region information, wherein the items of installation region information are each specific to different installation regions of the temperature sensor in the vehicle so that, for example, the temperature sensor (for example by the control device) may be configured via the modular interface unit such that the temperature sensor (technically unmodified) can be used to detect the interior temperature for at least two different installation regions and/or vehicles.

Moreover and in another embodiment, at least three or at least four or at least five or at least eight or at least ten or at least 20 different installation regions or respectively items of installation region information are provided or predefined. This enables a particularly flexible use of the temperature sensor.

In another aspect, a system for determining an interior temperature of a vehicle is provided, the system having:
  at least one temperature sensor (in particular according to the first aspect) that is designed to (directly) detect the interior temperature,
  at least one control device of the vehicle, wherein the control device may, e.g., be designed to be arranged separately and/or structurally apart from and/or outside of the temperature sensor.

It is provided in this context that, e.g., the temperature sensor may be designed to determine at least one temperature value by evaluating raw detected data of the temperature sensor, wherein the evaluation may in one embodiment be performed at least partially by a processing unit. In another alternative or additional embodiment, at least one modular interface unit of the temperature sensor is provided for exchanging data with the control device in order to supply the temperature value for the control device. Hence the system according to the present aspect offers the same advantages as described in detail with reference to a temperature sensor according to the preceding aspect. Moreover, it can be provided that the temperature sensor of the system according to the present aspect is designed according to one or more embodiments of a temperature sensor according to the preceding aspect.

The direct detection may be performed, for example, in that the temperature sensor has a detection element (such as a temperature-dependent resistor) that is used electrically to detect and/or measure the temperature. In one embodiment, the detection element is exposed to the interior of the vehicle such that a temperature change in the interior brings about a change of (electrical) properties of the detection element. The change can then be electrically evaluated and/or read out where appropriate in order to determine the raw data.

Another advantage within the present context is achievable in an embodiment where the temperature sensor is connected to the control device via the interface unit in order to exchange data via a communication system, e.g., via a bus system, such as a LIN bus system or CAN bus system. This enables an easy and reliable modular connection for exchanging data.

In another embodiment the control device is a climate control device for an air-conditioning system of the vehicle. In an alternative or additional embodiment, the control device is another control device of the vehicle such as, for example, a window lifter control device or the like. Accordingly, the control device can supply or respectively control at least one additional vehicle function in addition to determining the interior temperature.

In another aspect, a method for determining an interior temperature of a vehicle is provided. The method of the current aspect may use at least one temperature sensor and at least one control device of the vehicle.

In this context, and in one embodiment, at least one of the following steps is performed, wherein the steps may be performed sequentially or in any sequence and wherein individual steps may also be repeated:
  transmission of (e.g. digital and/or numeric) installation region data from the control device to the temperature sensor, or respectively via a communication system, wherein the installation region data are specific to a specific installation region of the temperature sensor in the vehicle,
  detection of the interior temperature by the temperature sensor to determine raw detected data,
  evaluation by the temperature sensor in which the raw detected data are evaluated depending on the transmitted installation region data so that at least one temperature value is determined, in particular by a (possibly electronic) processing unit,
  transmission of the at least one temperature value (from the temperature sensor) to the control device so that, using the at least one temperature value, a result (in particular a measurement result) of the interior temperature detection is provided to the control device, wherein the specific installation region may in an embodiment taken into account.

Hence the method according to the current aspect offers the same advantages as described in detail with reference to a temperature sensor according to the first aspect and/or a system according to the second aspect. Furthermore, the method can be suitable to operate a system according to the first aspect and/or a temperature sensor according to the second aspect.

For example, this can yield the advantage that the control device can be used without technical modification, such as adapting the control device software, with different temperature sensors and/or for different installation regions of the temperature sensors and/or for different vehicles. In one embodiment, the temperature sensor may be already pre-configured and/or designed and/or programmed for different installation regions and/or vehicles and/or for the use of a modular interface for exchanging data with the control device and/or for evaluating the raw detected data.

It is furthermore conceivable that raw detected data are not transferred to the control device via the interface unit, but rather in particular (only) the at least one temperature value. This enables an easier evaluation by the temperature sensor in a corresponding embodiment.

According to an embodiment, and before the evaluation is performed, at least one item of vehicle information is transmitted to the temperature sensor, in particular by the control device, for example via the communication system, wherein the item of vehicle information is specific to the specific vehicle (e.g. the vehicle type) so that the evaluation is performed depending on the vehicle information, so that in particular the specific vehicle is taken into account in the supplied/provided result of detecting the interior temperature. For example, the vehicle information may, e.g., be dependent on a specific type of vehicle or the like so that the temperature sensor may be used for as many different vehicles as possible. This can reduce costs and adaptation effort.

Moreover, it is conceivable in an embodiment that the installation region data and/or the temperature value and/or the vehicle information is transmitted according to a modular interface protocol, for example a LIN protocol or CAN protocol, such as via a modular interface unit, e.g., via a LIN bus or CAN bus. This enables a specific interface to be able to be used in order to ensure exchangeability of the temperature sensor type.

In addition, it is possible in an embodiment that the transmitted installation region data are used by the temperature sensor to select an item of installation region information, wherein the item of installation region information may, e.g., persistently saved/stored in a data memory unit of the temperature sensor in addition to other items of installation region information for other installation regions. In other words, the installation region data may be transmitted by the control device to the temperature sensor to thereby communicate to the temperature sensor that it should perform the evaluation for a specific installation region. For this purpose, the temperature sensor may then, e.g., use the item of installation region information, by means of which the evaluation can be adapted corresponding to the communicated installation region. It may, e.g., be possible to previously (persistently) save in the temperature sensor different items of installation region information for different possible installation regions in the vehicle before using the temperature sensor in the vehicle. The items of installation region information may be, for example, ascertained by carrying out test drives with the temperature sensor. In so doing, the parameters can then be determined for different installation regions (and stored in the form of the item of installation region information) that are needed for evaluating the raw detected data in order to ascertain the correct temperature for the specific installation position.

In one embodiment, the transmitted installation region data for the temperature sensor is unspecific so that the installation region data only comprise the information on a specific installation region and not on the parameters. This enables the temperature sensor to be exchanged flexibly and the control device to be designed simply. In other words, the installation region data may comprise just local information on the installation region. It is also possible, where appropriate, for the control device to just transmit data to the temperature sensor that are independent of the temperature sensor type.

In yet another aspect, a computer program product for a temperature sensor for determining at least one temperature value is provided. The computer program product may be designed to perform an evaluation according to a method according to the preceding aspect.

Hence the computer program product according to the current aspect offers the same advantages as described in detail with reference to a system according to the preceding and/or a method according to the preceding and/or a temperature sensor according to the preceding.

In particular, the computer program product may in an embodiment be integrated into the temperature sensor. For example, the computer program product may accordingly in one embodiment be integrated into the temperature sensor as a software module (in particular of the UIP) specific to a temperature sensor type, and accordingly no longer has to be within the ambit of the control device, in particular the climate control device. This reduces the effort of using the temperature sensor.

Additional advantages, features and details of the invention are apparent in the following description in which various further exemplary embodiments are described in detail with reference to the drawings.

Figure 1:
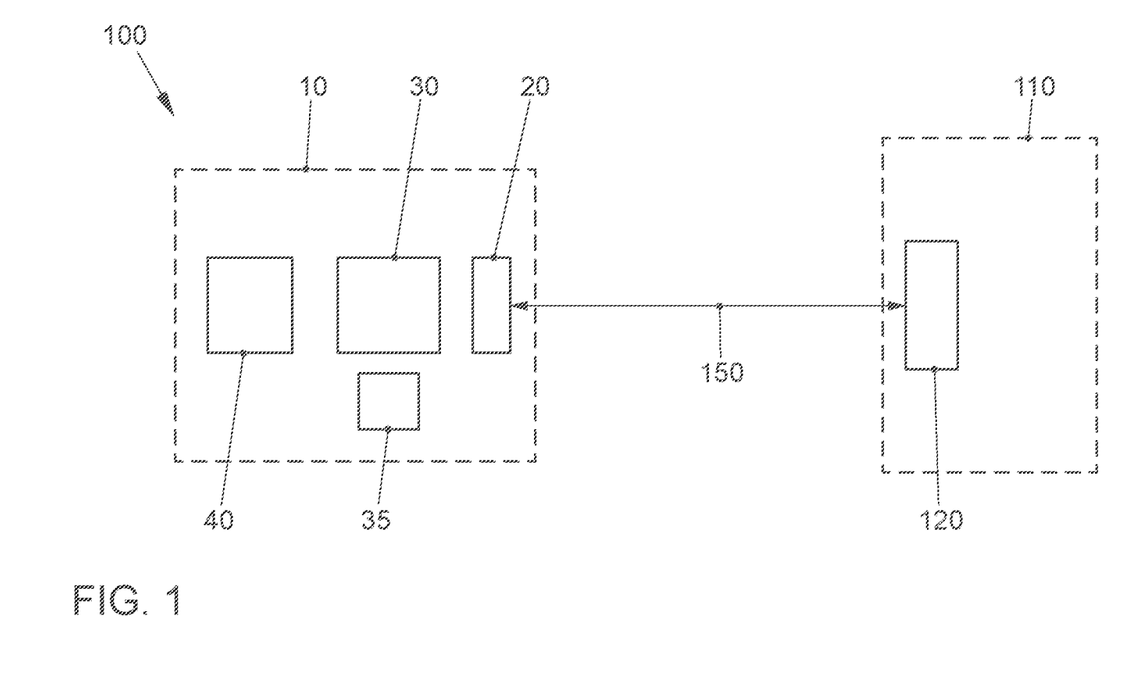
FIG. 1 shows a schematic representation of a system according to an embodiment of the invention with a temperature sensor according to an embodiment the invention.

FIG. 1 schematically shows a system 100 according to an embodiment of the invention with a temperature sensor 10. In this example, the temperature sensor 10 comprises at least one interface unit 20 and/or at least one processing unit 30 and/or at least one data memory unit 35 and/or at least one detection element 40. The detection element 40 is, for example, designed temperature-dependent and/or as an electrical component, in particular as a temperature-dependent resistor or the like. In this manner, an (electrical) signal that is specific to a change in temperature can be determined using an (electrical) property of the detection element 40. From the signal, in particular the raw detected data of the temperature sensor 10 can then be determined that, however, are specific to the temperature sensor type (i.e., dependent on the specific temperature sensor). Accordingly, the detected temperature cannot yet be ascertained directly by means of the raw detected data without knowledge about the temperature sensor as well. For example, the raw detected data can be an electrical (current and/or voltage) signal that, for example, is at the detection element 40.

It is also conceivable to determine the raw detected data by means of an electrical or electronic evaluation of such a signal, in particular, however, without filtering out the idiosyncrasies specific to the temperature sensor. Consequently, a more extensive evaluation of the raw detected data can be carried out by means of the processing unit 30 in order to determine at least one temperature value T. The temperature value T enables in particular direct interpretation as a temperature, if applicable independent of the knowledge about the temperature sensor.

A communication system 150, in particular a bus system 150, is provided to supply the temperature value T to a control device 110 of the vehicle 1. The interface unit 20 of the temperature sensor 10 and a control device interface 120 of the control device 110 each serve as a modular interface to the communication system 150.

Figure 2:
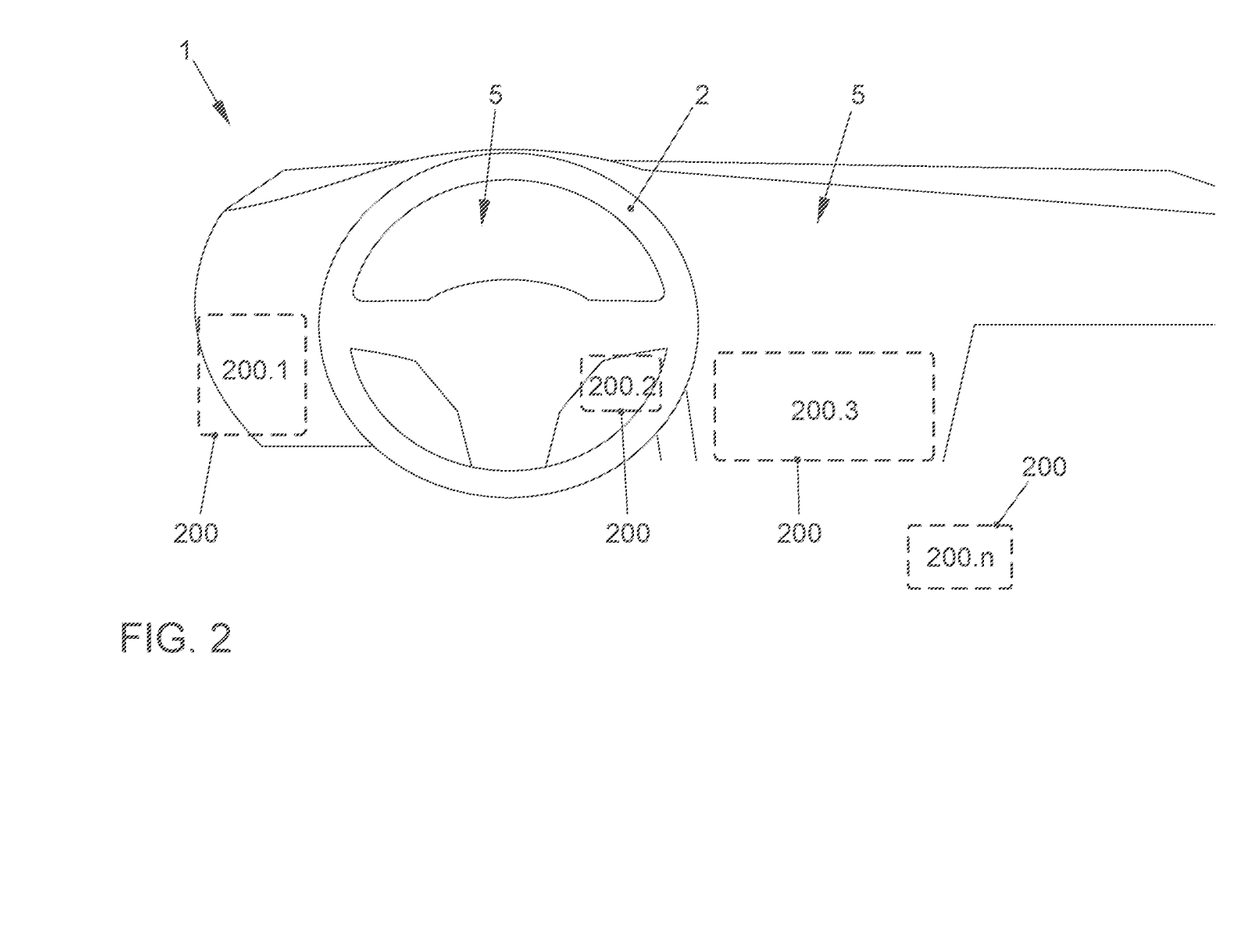
FIG. 2 shows another schematic representation of parts of an embodiment in a vehicle interior.

Different installation regions 200 for the temperature sensor 10 in a vehicle 1 are schematically shown as an example in FIG. 2. The installation regions 200 can, for example, be provided in the region of an instrument panel 5 of the vehicle 1. A first and second installation region 200.1, 200.2 are therefore schematically illustrated on the left and right in the region of a steering wheel 2. Another third installation region 200.3 can also be located in the region of the middle console. If applicable, other installation regions 200 can also be provided, i.e., an n-th installation region 200.n (wherein n can be any whole number).

Figure 3:
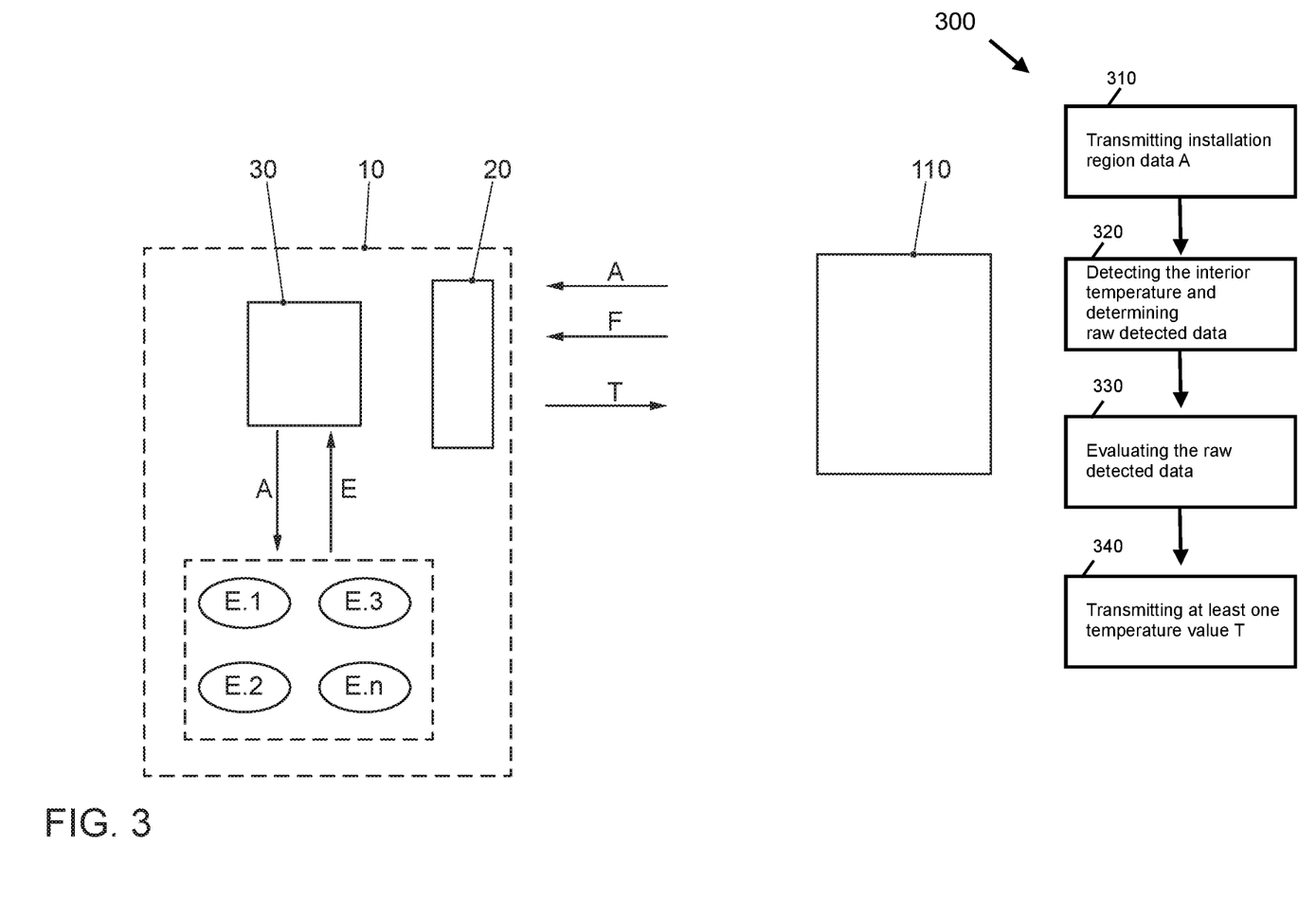
FIG. 3 shows a schematic representation to visualize a method according to an embodiment of the invention.

FIG. 3 schematically visualizes a method 300 according to one embodiment. According to a first method step 310, installation region data A are transmitted in this context by the control device 110 (for example via a control device interface 120, then via a communication system 150 to an interface unit 20 of the temperature sensor 10) to the temperature sensor 10, wherein the installation region data A are specific to a specific installation region 200 of the temperature sensor 10 in the vehicle 1. Such specific installation regions 200 are, for example, schematically shown in FIG. 2 (for example a first, second and if applicable n-th installation region 200.1, 200.2, 200.n).

Then, according to a second method step 320, detection of the interior temperature is carried out by the temperature sensor 10 to determine the raw detected data. Then, according to a third method step 330, an evaluation is, e.g., carried out by the temperature sensor 10, in particular by a processing unit 30, during which the raw detected data is evaluated depending on the transmitted installation region data A. This makes it possible to determine at least one temperature value T. The dependence on the installation region data A provided in this context can ensure that the temperature value T is determined with sufficient precision taking into account the specific installation region 200 since different installation regions 200 require a different evaluation. The parameters for evaluation necessary for this can, for example, be ascertained in test drives and assigned to the installation regions 200 that are used here for the temperature sensor 10. Accordingly, for example, the manufacturer of the temperature sensor 10 can determine the parameters for evaluating different installation regions 200, for example with the test drives, and store them directly in the temperature sensor 10 (instead of in the control device 110). For this purpose, the parameters can, for example, be previously saved in the form of installation region information E in the temperature sensor 10. This has the advantage that, after being installed, the temperature sensor 10 only has to be informed by the control device 110 where it was specifically installed by using the installation region data A. The evaluation can then be automatically adapted by the temperature sensor 10 where applicable.

It is, for example, conceivable to persistently save/store in the temperature sensor 10 a first item of installation region information E.1 for a first installation region 200.1, a second item of installation region information E.2 for a second installation region 200.2, a third item of installation region information E.3 for a third installation region 200.3, and an n-th item of installation region information E.n for an n-th installation region 200.n.

The associated item of installation region information E can then be read out using the installation region data A. This assignment is specified so that, for example, the installation region data A comprise a numeric value, such as an ID for the item of installation region information E that makes it possible to clearly select the item of installation region information E.

It is also possible, where applicable, to take into account an item of vehicle information F in the evaluation in addition to the installation region data A. Analogous to the installation region data A, at least one parameter for the evaluation that is provided for the item of vehicle information F can then be read out by the temperature sensor 10, for example by using the vehicle information F. Alternatively or in addition, the vehicle information F can already comprise this parameter.

After the evaluation, the at least one temperature value T is transmitted to the control device 110 according to a fourth method step 340 so that, using the at least one temperature value T, a result from detecting the internal temperature is provided to the control device 110 in which the specific installation region 200 is taken into account.

The preceding explanation of the embodiments describes the present invention exclusively within the context of examples and embodiments. Of course, individual features of the embodiments, to the extent that they are technically useful, can be freely combined with each other without departing from the context of the present invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfil the functions of several items recited in the claims.

The mere fact that certain measures are recited in mutually different dependent claims or embodiments does not indicate that a combination of these measures cannot be used in a beneficial way. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE NUMBER LIST

1 Vehicle
2 Steering wheel
5 Instrument panel
10 Temperature sensor
20 Interface unit
30 Processing unit
35 Data memory unit
40 Detection element
100 System
110 Control device
120 Control device interface
150 Communication system, bus system
200 Installation region
200.1 First installation region
200.2 Second installation region
200.3 Third installation region
200.n n-th installation region
300 Method
A Installation region data
E Installation region information
E.1 First item of installation region information
E.2 Second item of installation region information
E.3 Third item of installation region information
E.n n-th item of installation region information
F Vehicle information
T Temperature value

What is claimed is:

1. A temperature sensor for a vehicle, the temperature sensor configured to detect an interior temperature of the vehicle, wherein the temperature sensor at least comprises:
at least one detection element for determining raw detected data, corresponding to the interior temperature;
at least one processing unit for determining at least one temperature value by evaluating the raw detected data from the detection element; and
at least one modular interface unit for data exchange with at least one control device of the vehicle, so that the at least one temperature value is provided via the at least one modular interface unit to the at least one control device; wherein
the at least one processing unit is further configured to:
receive installation region data, wherein the installation region data are specific to a specific installation region of the temperature sensor in the vehicle;
evaluate the raw detected data depending on the installation region data, so that the at least one temperature value is determined; and
transmit the at least one temperature value to the at least one control device, so that, using the at least one temperature value, a result from detecting the interior temperature is provided to the at least one control device, in which the specific installation region is taken into account.

2. The temperature sensor of claim 1, wherein the at least one modular interface unit comprises at least one of a bus system interface and a local interconnect network (LIN) bus interface.

3. The temperature sensor of claim 1, wherein the temperature sensor further comprises a data memory unit for a non-volatile storage of at least two different items of installation region information, wherein the at least two different items of installation region information are each specific to different installation regions of the temperature sensor in the vehicle.

4. A system for ascertaining an interior temperature of a vehicle, the system comprising:
at least one temperature sensor, designed to directly detect the interior temperature; and
at least one control device of the vehicle, wherein the at least one temperature sensor at least comprises:
at least one detection element for determining raw detected data, corresponding to the interior temperature;
at least one processing unit for determining at least one temperature value by evaluating the raw detected data from the detection element; and
at least one modular interface unit for data exchange with the at least one control device of the vehicle, so that the at least one temperature value is provided via the at least one modular interface unit to the at least one control device; wherein
the at least one processing unit is further configured to:
receive installation region data, wherein the installation region data are specific to a specific installation region of the at least one temperature sensor in the vehicle;
evaluate the raw detected data depending on the installation region data, so that the at least one temperature value is determined; and
transmit the at least one temperature value to the at least one control device, so that, using the at least one temperature value, a result from detecting the interior temperature is provided to the at least one control device, in which the specific installation region is taken into account.

5. The system of claim 4, wherein the at least one temperature sensor is connected to the at least one control device via the at least one modular interface unit in order to exchange data via a communication system.

6. The system of claim 4, wherein the at least one control device is a climate control device for an air-conditioning system of the vehicle.

7. The system of claim 4, wherein the at least one temperature sensor is connected to the at least one control device via the at least one modular interface unit in order to exchange data via a bus system.

8. The system of claim 4, wherein the at least one temperature sensor is connected to the at least one control device via the at least one modular interface unit in order to exchange data via a local interconnect network (LIN) bus system.

9. A method for ascertaining an interior temperature of a vehicle, wherein at least one temperature sensor and at least one control device of the vehicle are provided, the method having at least the following steps:
- receiving installation region data by the at least one temperature sensor, wherein the installation region data are specific to a specific installation region of the at least one temperature sensor in the vehicle;
- determining, by at least one temperature sensor, raw detected data, corresponding to the interior temperature;
- evaluating, by the at least one temperature sensor, the raw detected data depending on the installation region data, so that at least one temperature value is determined; and
- transmitting the at least one temperature value to the at least one control device, so that, using the at least one temperature value, a result from detecting the interior temperature is provided to the at least one control device, in which the specific installation region is taken into account.

10. The method of claim 9, wherein before the evaluation is performed, at least one item of vehicle information is transmitted to the at least one temperature sensor, wherein the at least one item of vehicle information is specific to the vehicle, so that the evaluation is performed depending on the vehicle information, so that the vehicle is taken into account in the provided result of detecting the interior temperature.

11. The method of claim 9, wherein at least one of the installation region data, the at least one temperature value, and vehicle information is exchanged according to a modular interface protocol.

12. The method of claim 9, wherein the received installation region data are used by the at least one temperature sensor to select an item of installation region information.

13. The method of claim 9, wherein at least one of the installation region data, the at least one temperature value, and vehicle information is exchanged according to a local interconnect network (LIN) protocol.

14. The method of claim 9, wherein at least one of the installation region data, the at least one temperature value, and vehicle information is exchanged via a modular interface unit.

15. The method of claim 9, wherein at least one of the installation region data, the at least one temperature value, and vehicle information is exchanged via a local interconnect network (LIN) bus.

16. The method of claim 9, wherein the received installation region data are used by the at least one temperature sensor to select an item of installation region information, wherein the item of installation region information is persistently saved in a data memory unit of the at least one temperature sensor in addition to other items of installation region information for other installation regions.

17. A non-transitory storage medium comprising a computer program for determining at least one temperature value from a temperature sensor, the computer program, when executed by a processor of the temperature sensor, causes the processor to:
- receive installation region data, wherein the installation region data are specific to a specific installation region of the temperature sensor in a vehicle;
- determine raw detected data, corresponding to an interior temperature of the vehicle;
- evaluate the raw detected data depending on the installation region data, so that at least one temperature value is determined; and
- transmit the at least one temperature value to at least one control device, so that, using the at least one temperature value, a result from detecting the interior temperature is provided to the at least one control device, in which the specific installation region is taken into account.

* * * * *